US010543557B2

(12) United States Patent
Carletti et al.

(10) Patent No.: US 10,543,557 B2
(45) Date of Patent: Jan. 28, 2020

(54) WELDING TORCH AND DEVICE USING SAID TORCH

(71) Applicant: TRAFIMET GROUP S.P.A., Castegnero (IT)

(72) Inventors: Claudio Carletti, Costermano (IT); Ugo Simioni, Vicenza (IT); Attilio Imi, Pagnacco (IT)

(73) Assignee: TRAFIMET GROUP S.P.A., Castegnero (IT)

( * ) Notice: Subject to any disclaimer, the term of this patent is extended or adjusted under 35 U.S.C. 154(b) by 191 days.

(21) Appl. No.: 15/552,390

(22) PCT Filed: Feb. 15, 2016

(86) PCT No.: PCT/IB2016/050789
§ 371 (c)(1),
(2) Date: Aug. 21, 2017

(87) PCT Pub. No.: WO2016/132271
PCT Pub. Date: Aug. 25, 2016

(65) Prior Publication Data
US 2018/0036826 A1    Feb. 8, 2018

(30) Foreign Application Priority Data

Feb. 20, 2015    (IT) .............................. V12015A0054

(51) Int. Cl.
*B23K 15/00*    (2006.01)
*B23K 9/10*    (2006.01)
(Continued)

(52) U.S. Cl.
CPC ............ *B23K 9/295* (2013.01); *B23K 9/1006* (2013.01); *B23K 9/16* (2013.01)

(58) Field of Classification Search
CPC ........ B23K 9/1006; B23K 9/16; B23K 9/164; B23K 9/167; B23K 9/173; B23K 9/291–296
(Continued)

(56) References Cited

U.S. PATENT DOCUMENTS 3,536,888 A * 10/1970 Borneman ............. B23K 9/291
219/136
6,414,268 B1    7/2002 Equiza et al.
(Continued)

FOREIGN PATENT DOCUMENTS

CN    105228787    *    1/2016
JP    H11245039 A        9/1999
KR    101341872 B2    12/2013

OTHER PUBLICATIONS

International Search Report for PCT/IB2016/050789 dated Jun. 22, 2016.
(Continued)

*Primary Examiner* — Sang Y Paik
(74) *Attorney, Agent, or Firm* — Millen, White, Zelano & Branigan, P.C.; William Nixon (57) ABSTRACT

A welding torch includes a main body and an end portion suited to be fed through the main body with a welding wire and a shielding gas. The end portion includes a welding unit electrically powered and provided with an internal channel for the passage of the welding wire. A conveyor element is provided with an outlet mouth to allow the welding wire to move out of the welding unit and to allow the shielding gas to be conveyed outside of the welding unit. Electrical insulation means are interposed between the welding unit and the conveyor element with an insulation portion made of an electrically non-conductive material. The welding torch includes the conveyor channel suited to convey the shielding
(Continued)

gas from the main body to the outlet mouth of the conveyor element. The conveyor channel is delimited at least partially by the insulation portion.

10 Claims, 9 Drawing Sheets

(51) Int. Cl.
    *B23K 9/29*     (2006.01)
    *B23K 9/16*     (2006.01)

(58) Field of Classification Search
    USPC ...... 219/121.11, 121.45–121.57, 136, 137 R,
                                      219/137.2–137.44
    See application file for complete search history.

(56) References Cited

U.S. PATENT DOCUMENTS

| | | |
|---|---|---|
| 2007/0056945 A1 | 3/2007 | Hammen et al. |
| 2014/0021183 A1 | 1/2014 | Peters et al. |

OTHER PUBLICATIONS

English Abstract of KR101341872, Publication Date: Dec. 17, 2013.
English Abstract of JPH11245039, Publication Date: Sep. 14, 1999.

\* cited by examiner

WELDING TORCH AND DEVICE USING SAID TORCH

TECHNICAL FIELD OF THE INVENTION

The present invention is related to the technical field of metallic material welding techniques.

In particular, the present invention is related to the production of a welding torch suitable for the use of GMAW (Gas Metal Arc Welding) technology.

More particularly, the present invention is related to the production of a welding torch suitable for the use of MIG (Metal Inert Gas) technology with insulated nozzle.

The present invention is also related to a device using said torch.

DESCRIPTION OF THE STATE OF THE ART

The use of welding technologies for joining materials, typically metallic materials, is known in several sectors, in particular in the industrial sector.

The welding technologies of the known type are grouped under the acronym GMAW (Gas Metal Arc Welding). These include, in particular, MIG (Metal-Inert-Gas) and MAG (Metal-Active-Gas) welding, which are differentiated from each other substantially for the different gas used to shield the welding bath.

The known technologies include the use of special equipment by specialized operators who work on the material to be welded.

For this purpose, said devices comprise an element suited to be handled by the operator and known under the name of torch, whose end is provided with a nozzle out of which a welding material exits in the form of a wire together with a given quantity of shielding gas. Said devices of the known type exploit the effect resulting from the generation of an electric arc between the torch and the piece to be welded, which melts the welding material with which the torch is fed. The melted welding material determines the welding area, or welding bath, and the shielding of the welding bath is ensured by the atmosphere defined by the shielding gas that flows out of the torch nozzle.

During the welding process, therefore, it is extremely important to shield the welding bath from contaminating agents that are present in the environment and that may lead to an imperfect welded joint. The presence of impurities in the welding bath may cause the generation of blowholes, cracks, alterations of the crystalline state that are such as to make the weld fragile and subject to possible breakages. The shielding gas is typically conveyed to the area to be welded through a system of pipes originating from the gas source, typically a gas cylinder, so that it flows into cavities present in the torch body until reaching the inside of the nozzle whose main function is exactly to direct the shielding gas towards the welding bath. At the same time, the wire of welding material is made advance through the torch by means of a suitable advance mechanism, until it reaches the nozzle. In order to produce the electric arc, electric current is also carried to the nozzle through a suitable element made of copper, or electrode. The electrode is typically made using a copper tube whose end portion, or tip, is arranged coaxially inside the nozzle. The copper tube is also properly covered by a tube of insulating material over its longitudinal extension and then wrapped by a further external tube or casing that defines the torch body.

Figure 9:
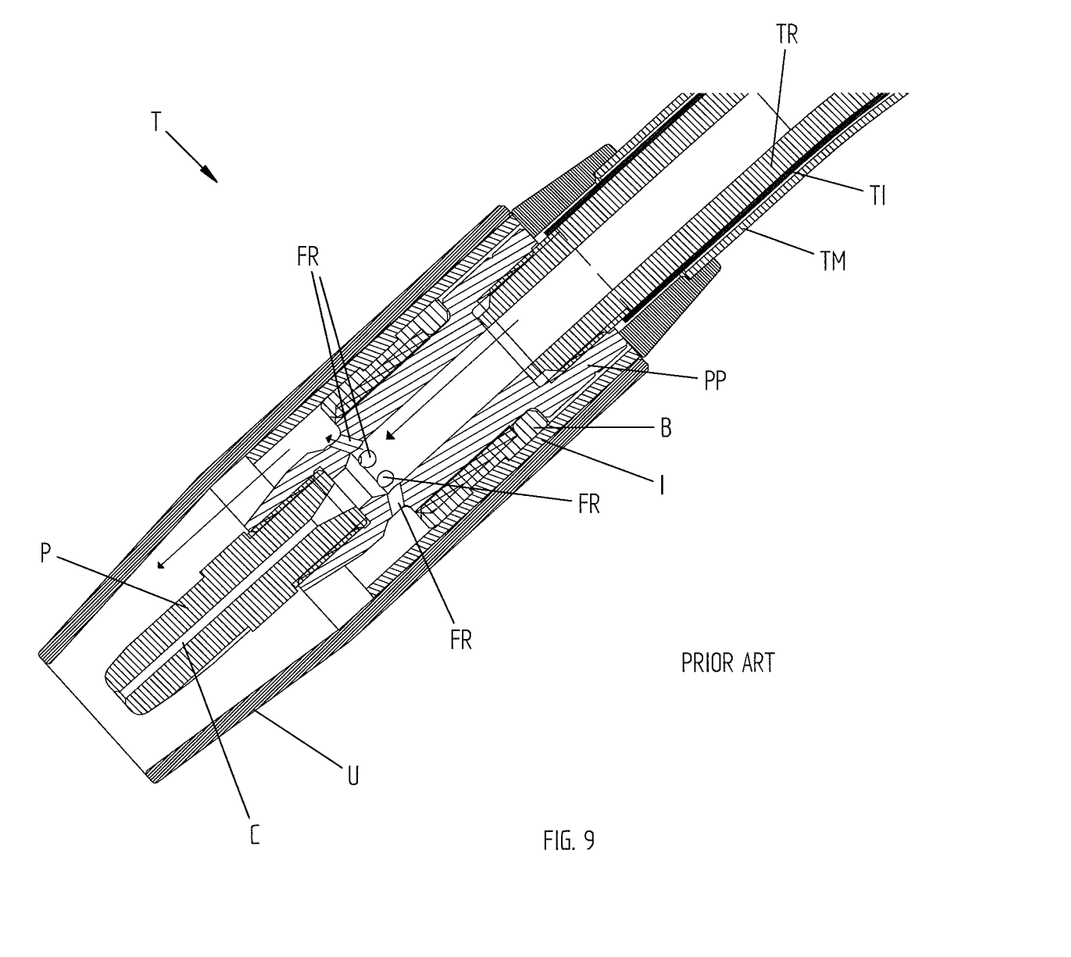
FIG. 9 shows a detail of a torch belonging to the known art.

In a first type of torch of the known type, the shielding gas flows inside the torch body together with the wire in a central channel. FIG. 9 shows the end portion of said type of torch T belonging to the known art.

The torch T comprises a current carrying copper tube TR, a tube made of an insulating material TI and an external tube or casing TM. A tip holder PP is properly screwed to the end of the current carrying tube TR and a replaceable tip P is finally screwed to the tip holder PP. The tip P and the tip holder PP are made of a conductive material, too, preferably copper, and the welding wire (not illustrated herein) is properly made advance in the central channel C that guides the tip P passing first inside the current carrying tube TR and the tip holder PP.

A nozzle U is externally associated with the tip holder PP through a suitable bushing B and a portion I made of an insulating material.

In this embodiment the shielding gas is also conveyed inside the current carrying tube TR and the tip holder PP. The tip holder PP is also provided with a series of radial holes FR thanks to which the shielding gas passes from an axial motion along the direction of the torch to a motion that is substantially perpendicular to it along the holes FR, and then again to an axial motion once having flowed past the tip holder PP, so as to be directed towards the outside of the nozzle U in the welding area where the arc starts and the wire melts. At the level of said holes FR the shielding gas flow loses its characteristics as a laminar flow. Sudden and quick changes of direction of the shielding gas path cause a turbulent motion of the shielding gas itself, which may cause negative pressures to be generated at the outlet of the nozzle U, thus attracting air/impurities inside the welding arc and therefore leading to the formation of blowholes.

Therefore, the systems for conveying the shielding gas in the torches of the known type pose some drawbacks.

A first drawback lies in that it is difficult to maintain for the flow of shielding gas the characteristics of a laminar flow as long as possible when it reaches the welding bath. In fact, the passage to a turbulent motion involves the creation of vortex motions that may bring impurities into the shielded area.

In the case of manual welding operations involving the direct intervention of the operator, it is possible to immediately intervene on the welding parameters (speed, distance of the nozzle hole from the piece, shielding gas pressure, etc.) in order to overcome/minimize said drawbacks.

In the case of automated welding operations carried out through welding robots, it is more difficult to intervene promptly and therefore said drawback is further amplified. Document KR 101341872 discloses in FIG. 4 an insulating element 30 comprising channels 32 on its internal surface. Document JP H 11 245039 discloses in FIG. 3 channels defined within the tip holder 5 and delimited by the insulating element 9. Document US 2007/0056945 illustrates in FIG. 3 an insulating element which does not comprise any kind of channels or grooves. Document U.S. Pat. No. 6,414,268 discloses in FIG. 4 a torch in which the gas is conveyed directly through the pipe 22 to the tip of the torch. Documents US 2014/0021183 discloses in FIG. 3 a torch having an insulating element 170. The insulating element does not comprise any channel.

The main object of the present invention is thus to overcome or at least partially solve the drawbacks mentioned above.

It is one object of the present invention to provide a welding torch that makes it possible to reduce the turbulent motions of the shielding gas that is conveyed to the nozzle and that produces the inert atmosphere of the welding bath.

In particular, it is one object of the present invention to provide a welding torch that makes it possible to maintain a motion that is as linear and laminar as possible for the shielding gas that flows out of the nozzle.

It is another object of the present invention to provide a solution that makes it possible to reduce the presence of impurities in the welding bath and to reduce the risk of creation of fragile welds that are thus subject to possible breakages.

It is a further object of the present invention to provide a solution that makes it possible to minimize the corrections of the welding parameters by the operator.

It is another object of the present invention to provide a welding torch that can advantageously be used in automated welding systems in which there is no direct intervention by the operator.

SUMMARY OF THE PRESENT INVENTION

The present invention is based on the general consideration that the problems observed in the state of the art can be at least partially overcome by providing a torch for welding in a shielding gas atmosphere, said torch being of the type comprising an end portion comprising a welding unit suited to be electrically powered and a conveyor element associated with the outside of said welding unit, wherein electrical insulation means are interposed between said conveyor element and said welding unit, said electrical insulation means comprising an insulating portion suited to delimit one or more channels suited to convey the shielding gas towards the welding area.

According to a first aspect of the present invention, therefore, the subject of the same is a welding torch of the type comprising a main body and an end portion suited to be fed through said main body with a welding wire and a shielding gas, said end portion comprising:
- a welding unit suited to be electrically powered and provided with an internal channel for the passage of said welding wire;
- a conveyor element associated with said welding unit, said conveyor element being provided with an outlet mouth suited to allow said welding wire to move out of said welding unit and said shielding gas to be conveyed outside said welding unit;
- electrical insulation means interposed between said welding unit and said conveyor element, said electrical insulation means comprising at least one insulating portion made of an electrically non-conductive material;
- at least one conveyor channel suited to convey said shielding gas from said main body to said outlet mouth of said conveyor element, wherein said at least one conveyor channel is at least partially delimited by said insulating portion.

In a first preferred embodiment, said at least one conveyor channel is created in the insulating portion and is completely delimited within the insulating portion.

In another preferred embodiment, the electrical insulation means furthermore comprise an inner interface element associated with the inside of the insulating portion, the inner interface element being interposed between the insulating portion and the welding unit.

Preferably, the conveyor channel is at least partially delimited by the insulating portion and at least partially delimited by the inner interface element.

According to a preferred embodiment of the invention, the insulating portion and the inner interface element develop longitudinally in a tubular shape, the inner interface element delimiting an internal area suited to at least partially accommodate the welding unit, wherein the inner interface element comprises at least one groove made on its external surface facing towards the insulating portion, so as to define said at least one conveyor channel.

In a preferred embodiment of the invention, said at least one groove develops longitudinally along the inner interface element, starting from a first end of the inner interface element.

More preferably, the inner interface element comprises a plurality of grooves made on its external surface facing towards the insulating portion, so as to define a plurality of conveyor channels.

According to a preferred embodiment of the invention, the inner interface element furthermore comprises at least one channel that places said at least one groove in communication with the internal area delimited by the inner interface element and the welding unit.

The conveyor element is preferably associated with the outside of the welding unit.

In a preferred embodiment, the torch comprises connection means suited to connect the electrical insulation means to the welding unit.

According to a preferred embodiment of the invention, the connection means are at least partially defined in the inner interface element.

According to another preferred embodiment of the invention, the connection means are at least partially defined on the insulating portion.

Said connection means preferably comprise a thread or provide a connection through mechanical interference or a snap-on connection.

According to a preferred embodiment of the invention, furthermore, the torch comprises connection means suited to connect the electrical insulation means to the conveyor element.

In another preferred embodiment, the electrical insulation means furthermore comprise an outer interface element associated with the outside of the insulating portion, the outer interface element being interposed between the insulating portion and the conveyor element.

Preferably, said connection means suited to connect the electrical insulation means to the conveyor element consist of mechanical interference or of a moulding and/or co-moulding operation in which the electrical insulation means are moulded and/or co-moulded together with the conveyor element.

According to a preferred embodiment of the invention, the welding unit comprises a tip provided with said internal channel for the passage of the welding wire.

In a preferred embodiment, the welding unit furthermore comprises a tip holder element provided with an internal channel for the passage of the welding wire, the tip holder element being suited to removably accommodate the tip.

Preferably, the tip holder element and the tip are removably associated with each other by screwing or through mechanical interference.

The main body of the torch preferably comprises means for supplying electric current for the welding unit and means for supplying the shielding gas.

According to a preferred embodiment of the invention, the electric current supply means for the welding unit comprise a tubular element made of an electrically conductive material suited to accommodate the welding wire and provided with external channels for supplying the shielding gas.

The welding unit is preferably connected to one end of the tubular element.

Preferably, the electrical insulation means convey the shielding gas arriving from the external channels of the tubular element towards the outlet mouth of the conveyor element.

According to another aspect of the present invention, the subject of the same is a device for making welds in an atmosphere defined by a shielding gas, comprising a welding torch, wherein said welding torch is made as described above.

BRIEF DESCRIPTION OF THE DRAWINGS

Further advantages, objects and characteristics, as well as further embodiments of the present invention are defined in the claims and will be highlighted in greater detail in the following description, with reference to the attached drawings. In particular:

DETAILED DESCRIPTION OF THE PRESENT INVENTION

Even though the present invention is described here below with reference to its embodiment represented in the drawings, the present invention is not limited to the embodiment described below and represented in the drawings. On the contrary, the embodiment described below and represented in the drawings clarifies some aspects of the present invention, the scope of which is defined in the claims.

The present invention has proven to be particularly advantageous when applied to the field of production of welding torches using MIG technology. It should however be pointed out that the present invention is not limited to the production of welding torches of that type. On the contrary, the present invention can be conveniently applied in all those cases requiring the use of metal arc welding torches with shielding gas. By way of example, the present invention can be extended to MAG welding technology.

Figure 1:
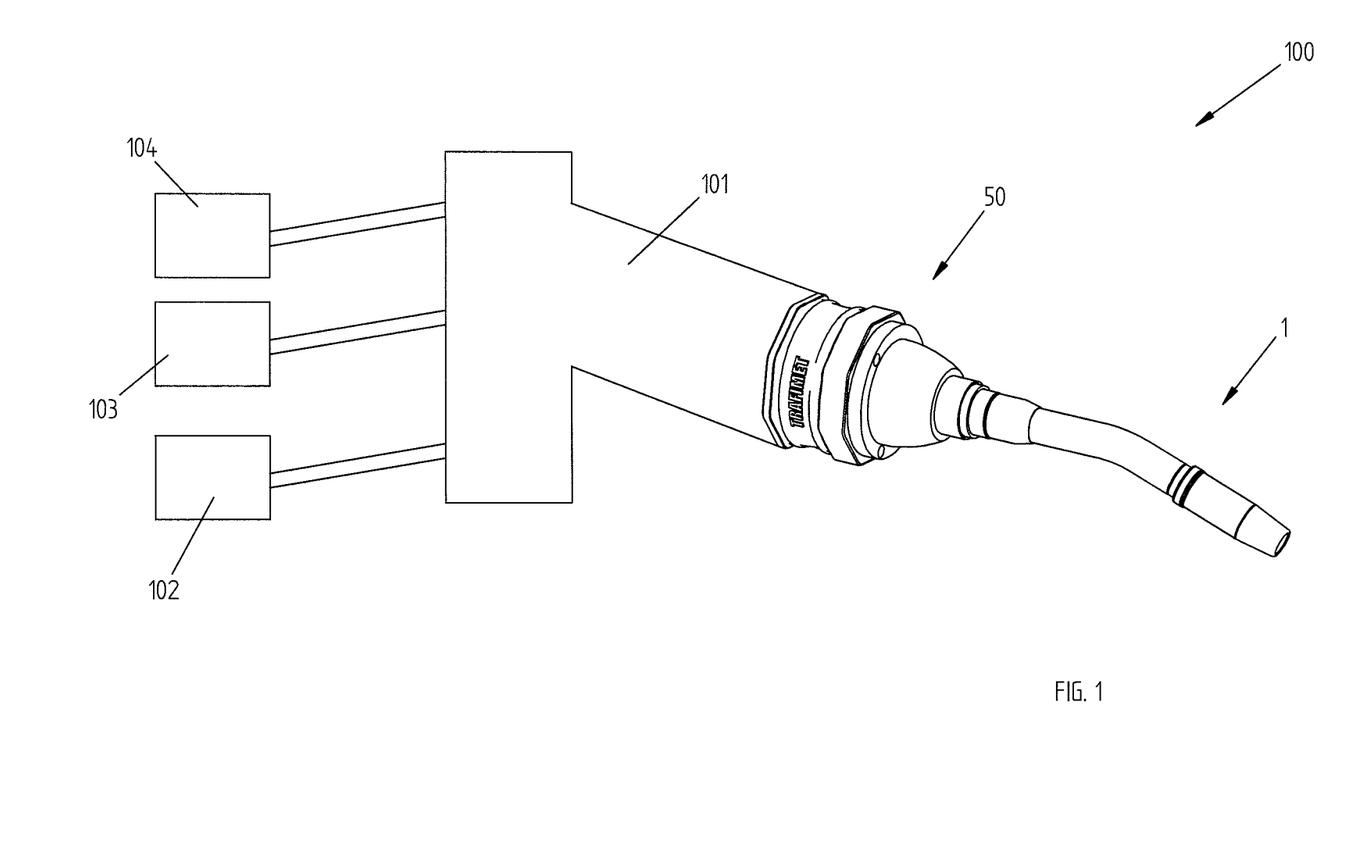
FIG. 1 shows an axonometric view of a torch according to a preferred embodiment of the invention, possibly used in an automated welding device.

FIG. 1 schematically shows an automated welding device 100 using MIG technology and using a torch according to a preferred embodiment of the invention, indicated as a whole by 1.

The welding device 100 preferably comprises said welding torch 1 applied to an automated station, or robot, 101 that controls its movements and/or welding parameters. The automated station 101 is preferably associated with an arc current generator unit, or power supply unit, 102, a shielding gas supply unit 103 and a wire feed and advance unit 104.

The generator 102 is suited to generate the current necessary to produce and maintain the electric arc at the level of the end of the welding torch 1, as explained in greater detail below.

The shielding gas used in the MIG technology preferably comprises argon (Ar) or helium (He) or mixtures of Ar and $CO_2$. The shielding gas supply unit 103 comprises, for example, a pressurized gas cylinder.

The torch 1 according to the invention is shown in FIG. 1, where it is applied to an automated station 101. In variant embodiments, however, the torch may be used in a known manner and handled directly by an operator who holds it in his/her hands.

Figure 2:
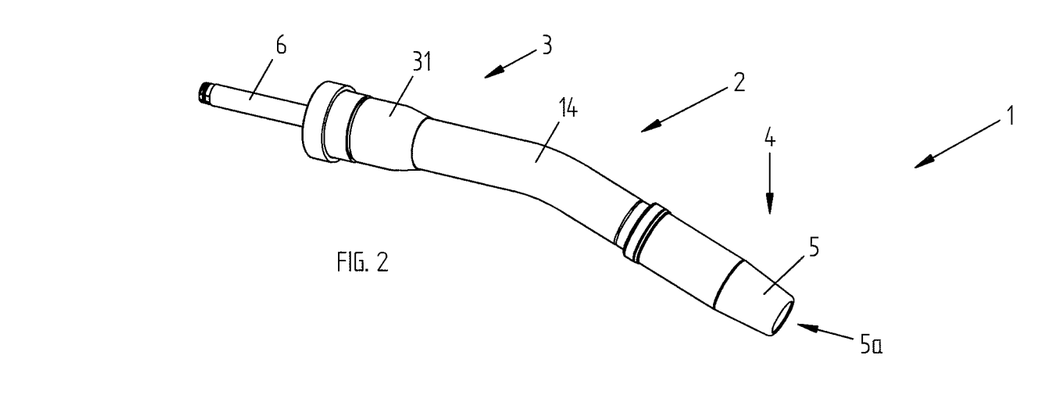
FIG. 2 shows the torch of FIG. 1 separated from the rest.
Figure 3:
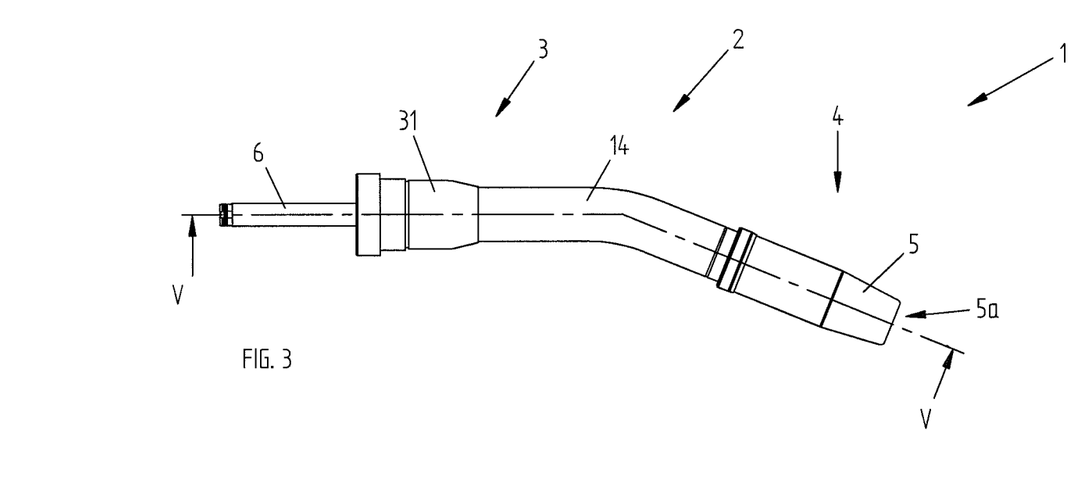
FIG. 3 shows a side plan view of FIG. 2.

FIG. 2 shows the torch 1 according to the preferred embodiment of the invention as a whole, separated from the rest. Suitable connection means, indicated as a whole by 50 in FIG. 1 and neither shown nor described in detail here below, are provided for applying the torch 1 to the robot 101.

The torch 1 preferably comprises a main body 2, if possible suited to be held by an operator, an initial portion 3 provided with a connection bushing 31 for connection with the robot 101 and an end portion 4 where the welding operation is carried out. According to the above, the robot 101 supplies the torch with the shielding gas and the welding wire.

The torch 1 has the function to convey the shielding gas and the welding wire into its end portion 4 that will be properly arranged at the level of the area to be welded in order to obtain the welding bath. In the end portion 4 a nozzle 5 with its outlet mouth 5a has the function to direct the shielding gas towards the welding bath.

The nozzle 5 preferably has a shape suited to convey the shielding gas in the correct direction.

In a preferred embodiment, the terminal portion of the nozzle is slightly conical. In variant embodiments, however, the terminal portion may have different shapes, for example it may be cylindrical.

Figure 4:
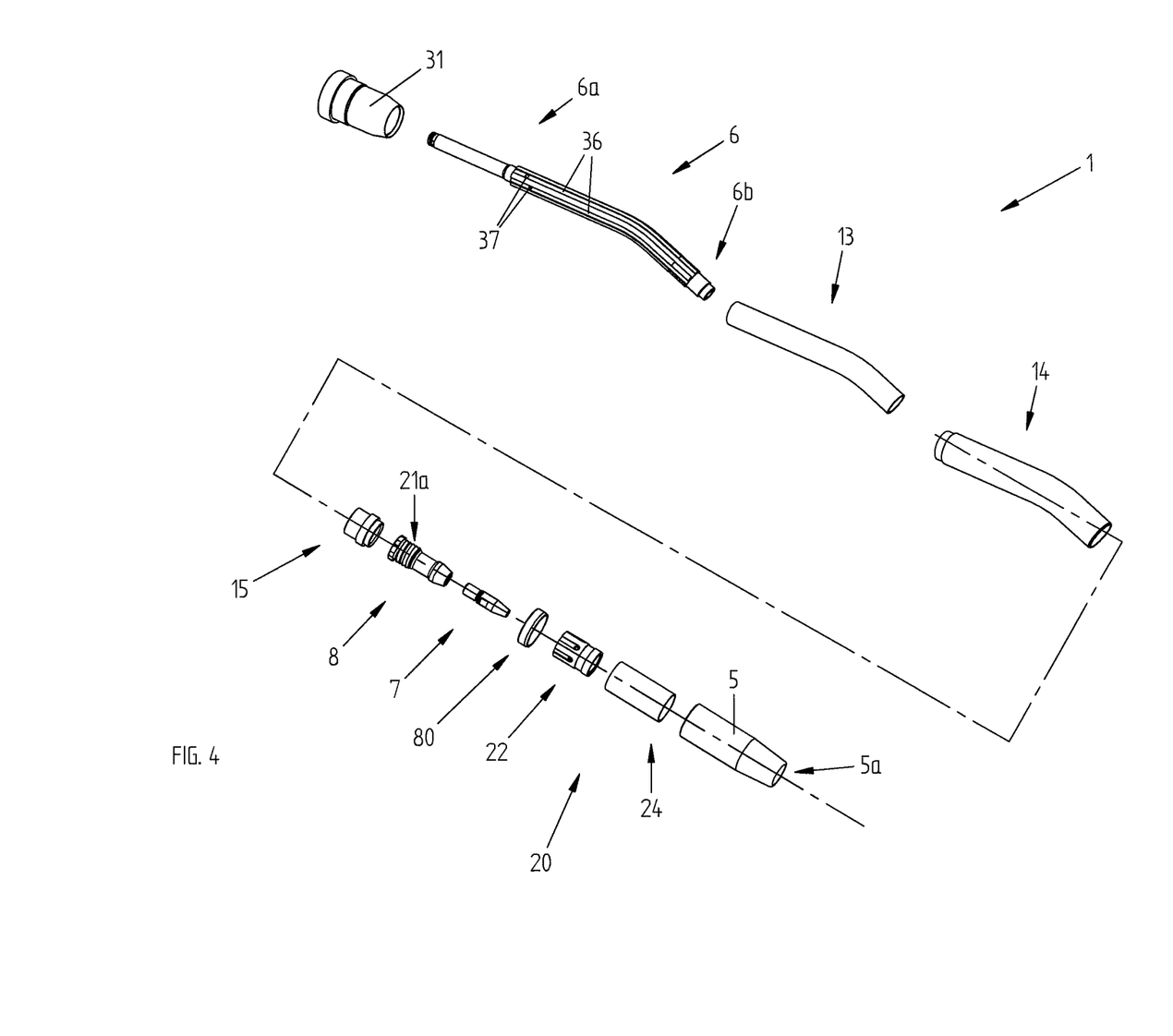
FIG. 4 shows an exploded view of the torch of FIG. 2.

As shown in FIG. 4, the torch 1 is provided, first of all, with a current carrying element 6 that is preferably tubular in shape and is made of an electrically conductive material, preferably copper.

The current carrying element 6 preferably has a first end 6a suited to be connected to the robot 101 so that it can be powered by the generator 102, through suitable connection means, and a second end 6b suited to be electrically and mechanically connected to a tip 7 arranged inside the nozzle 5.

The tip 7 comprises a central channel 11 suited to accommodate the welding wire (not represented herein) and is preferably connected to the second end 6b of the current carrying element 6 through a tip holder element 8. The tip holder element 8 is connected to the second end 6b through connection means preferably comprising an external thread 9a made on the current carrying element 6 and an internal thread 9b made on the tip holder element 8 (as shown in the detail of FIG. 5A). Said connection means allow the two elements to be screwed/unscrewed and therefore to be easily removed. In variant embodiments said connection means may be different, for example there may be a connection through mechanical interference, or a snap-on connection (bayonet), or a connection obtained through calking or welding. The tip 7 is in turn connected to the tip holder element 8 through connection means preferably comprising an external thread 10a made on the tip 7 and an internal thread 10b made on the tip holder element 8. Said connection means allow the two elements to be screwed/unscrewed and therefore to be easily removed. In variant embodiments said connection means may be different, for example there may be a removable connection through mechanical interference, or a snap-on connection (bayonet). The central area 12 of the tip holder element 8 is hollow and preferably shaped as a funnel in order to facilitate the introduction of the welding wire in the central channel 11 of the tip 7.

The tip 7 and the tip holder 8 are made of an electrically conductive material, preferably copper, in order to ensure the passage of the electric current flowing from the current carrying element 6 towards the welding wire. Inside the channel 11 of the tip 7, in fact, the wire is in contact with the tip 7 itself. The welding wire originating from the robot 101, in fact, is first made advance inside the current carrying element 6, then inside the central area 12 of the tip holder 8 and then in the channel 11 of the tip 7.

The tip holder 8 is preferably made of copper or brass and serves to avoid the need to screw the tip 7 directly on the current carrying element 6 and to facilitate the assembly/disassembly and/or replacement of the tip 7. The tip 7, in fact, is the part directly in contact with the wire during the welding operation and therefore is subject to wear and overheating, and consequently is an element that needs to be periodically replaced. The tip 7 is preferably made of copper.

The tip 7 and the tip holder 8 define a welding unit.

In variant embodiments, however, the tip might be connected directly to the current carrying element 6, and the welding unit may be defined only by the component constituted by the tip.

Going back to the description of the main body 2, the outside of the current carrying element 6 is associated with an electrically insulating element 13, preferably tubular in shape, and with an external tube 14 suited to grant the desired mechanical and functional characteristics and if necessary the suitable ergonomic features for the case where the torch needs to be held by an operator. The electrically insulating element 13 guarantees electrical insulation between the current carrying element 6 and the outside. The electrically insulating element 13 is preferably made of PTFE. The external tube 14 is preferably made of aluminium.

Figure 5:
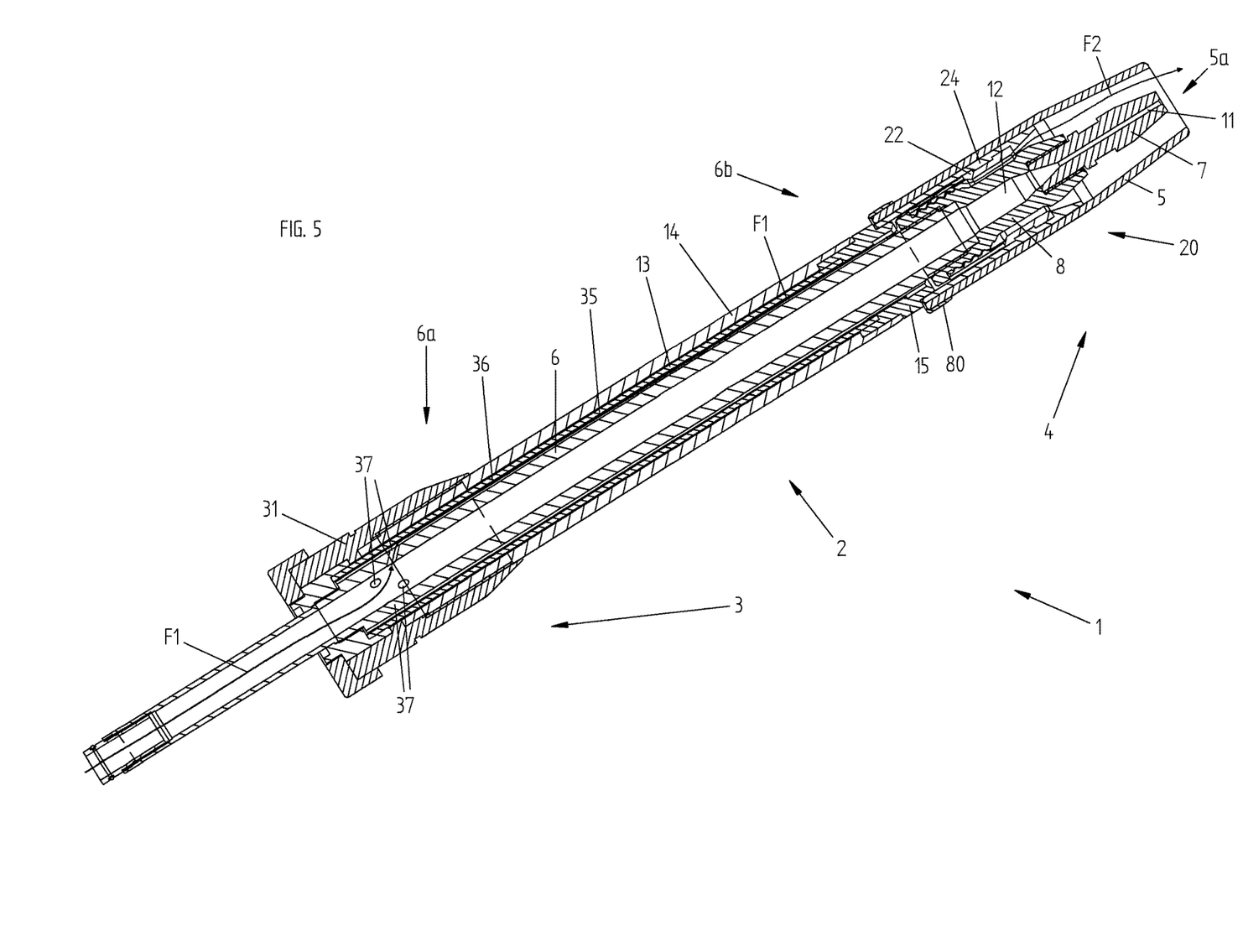
FIG. 5 shows a sectional view of FIG. 3 along line V-V.
Figure 5A:
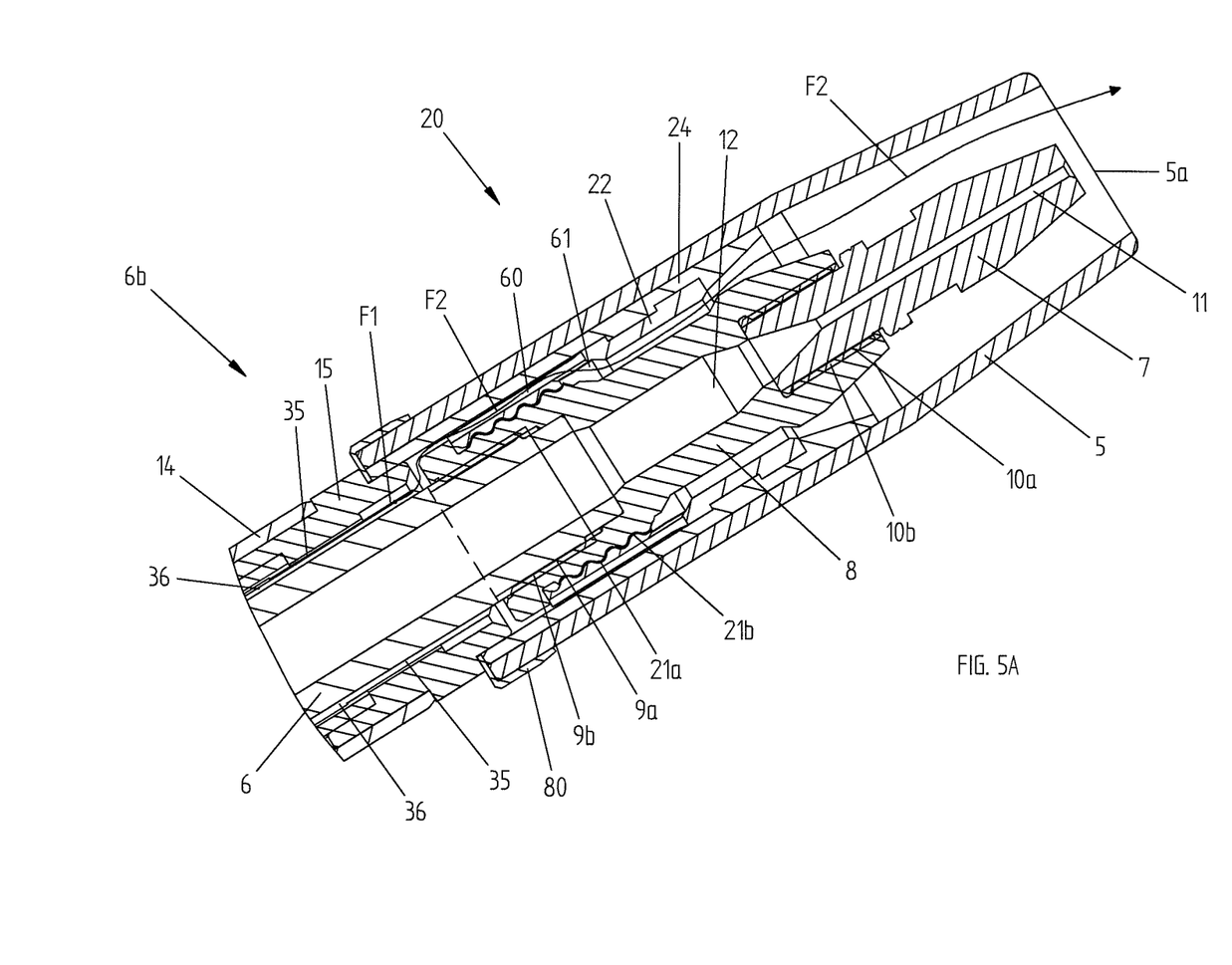
FIG. 5A shows an enlarged detail of FIG. 5.
Figure 5B:
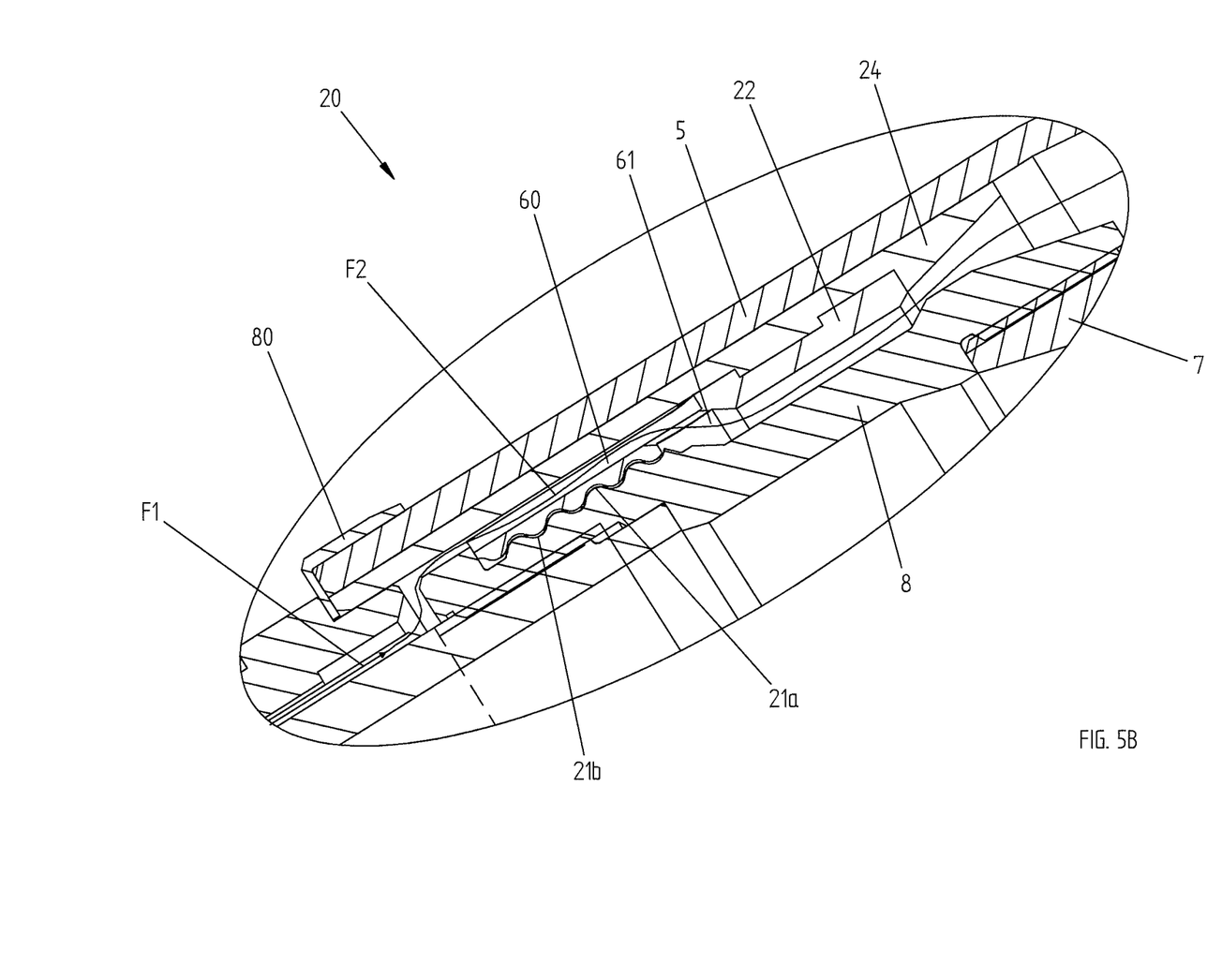
FIG. 5B shows an enlarged detail of FIG. 5A.
Figure 6:
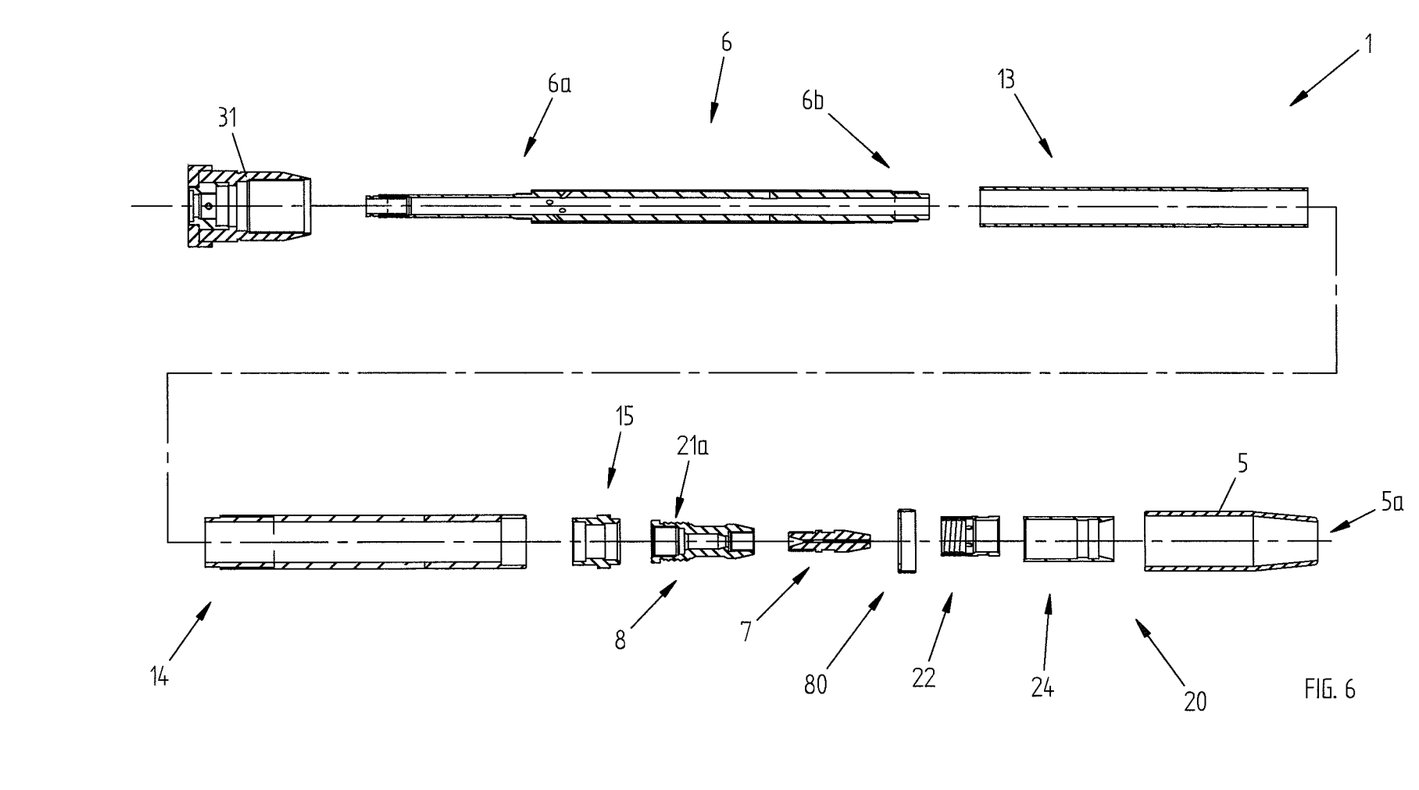
FIG. 6 shows an exploded view of FIG. 5.

The current carrying element 6 comprises, on its external surface, a plurality of recesses 36 that develop longitudinally and, together with the external electrically insulating element 13, define a plurality of corresponding conveyor channels 35 for the shielding gas, as indicated by the flow line F1 in FIG. 5. The shielding gas flowing from the robot 101 to the torch 1 in the central portion of the current carrying element 6 is conveyed to the external recesses 36 via corresponding through holes 37 made in the current carrying element 6. The through holes 37 are made through the thickness of the current carrying element 6 and preferably are slightly inclined in order to convey the shielding gas with a smooth flow from the inside of the current carrying element 6 to the external recesses 36.

In the embodiment illustrated herein, the external recesses 36 have a substantially rectangular cross section. In different variant embodiments, however, the external recesses that define the conveyor channels for the shielding gas can assume different shapes and configurations than illustrated and described herein.

For example, in a preferred embodiment the conveyor channels may also be in the shape of a spiral or a helix.

In further preferred embodiments, the conveyor channels may be completely obtained within the electrically insulating element, or, still preferably, they may be obtained partially in the current carrying element and partially in the electrically insulating element.

As previously described, the tip holder element 8 is connected at the level of the end portion 4 of the torch 1 on the second end 6b of the current carrying element 6.

An insulating bushing 15 is mounted at the level of the end portion 4 of the torch, externally to the current carrying element. The bushing 15 serves as a centering element between the current carrying element 6 and the external tube 14 and makes it possible to maintain the correct coaxiality between said two elements 6 and 14. In fact, correct coaxiality is not generally guaranteed by the insulating element 13 interposed between the two elements 6 and 14, as the insulating element 13 is typically made of a soft material.

For this purpose, the bushing 15 is made with a rigid material with such mechanical, thermal and insulating characteristics that it can resist the stress to which it is subjected during the welding operation.

Furthermore, a stop ring 80 is preferably interposed between the bushing 15 and the nozzle 5, wherein said stop ring 80 seals the space between the bushing 15 and the nozzle 5.

Insulation means 20 are interposed between the nozzle 5 and the tip holder element 8.

Figure 7:
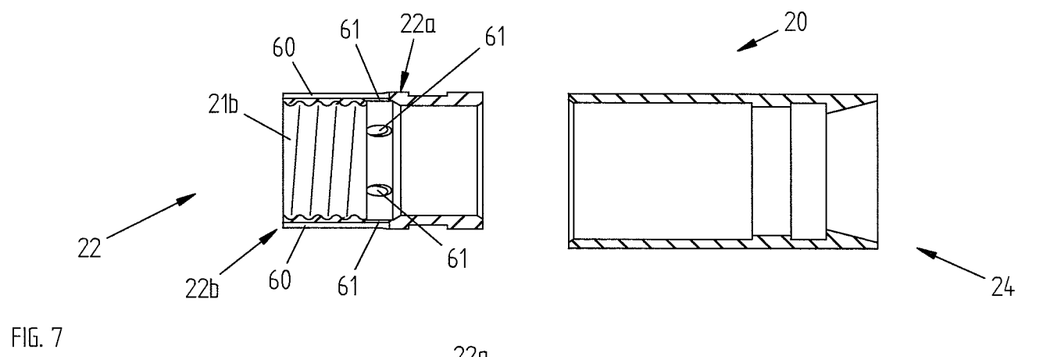
FIG. 7 shows an enlarged view of some details of FIG. 6.

The insulation means 20, shown in their distinct components in FIG. 7, but typically constituting a single unit together with the nozzle 5, are connected to the tip holder element 8 through connection means preferably comprising an external thread 21a made on the tip holder element 8 and an internal thread 21b made on the insulation means 20. Said connection means allow the insulation means 20 to be screwed/unscrewed and therefore easily removed from the rest of the torch. More particularly, said connection means allow the integrated unit constituted by the insulation means 20 and the nozzle 5 to be screwed/unscrewed and therefore easily removed from the rest of the torch.

In variant embodiments, said connection means may be different, for example a connection through mechanical interference or a snap-on connection (bayonet) may be provided.

The insulation means 20 are preferably connected to the nozzle 5 through a moulding or co-moulding operation.

In variant embodiments, the connection means that connect the insulation means to the nozzle 5 may be different, for example a connection through mechanical interference or a screwing or a snap-on (bayonet) connection or a connection by glueing may be provided.

The insulation means 20, as shown in FIG. 7, preferably comprise an inner element 22 (inner interface) and an electrical insulation portion 24 (insulating portion 24).

The inner interface 22 is preferably tubular in shape, with longitudinal development, and internally delimits an area in which the tip holder 8 and the tip 7 are accommodated.

The inner interface 22 is preferably made of a metallic material.

Said internal thread 21b is provided on the inner interface 22.

The electrical insulation portion 24 guarantees electrical insulation between the tip holder element 8 and the outside, in particular the nozzle 5. As explained above, in fact, the tip holder element 8 is crossed by current for the tip 7 and thus needs to be insulated from the external environment. The electrical insulation portion 24 is preferably made of a thermosetting material or a material of the silicone type. The electrical insulation portion 24 is preferably obtained through an injection process by means of which the insulating material is injected into a mould where the inner interface 22 and the nozzle 5 are positioned. At the end of this process the inner interface 22, the electrical insulation portion 24 and the nozzle 5 define a single unit. The electrical insulation portion 24 is preferably tubular in shape, with longitudinal development.

In variant embodiments, however, the insulation means 20 and the nozzle 5 can be made separately and then associated with each other.

According to an aspect of the present invention, the insulation means 20 comprise one or more conveyor channels suited to convey the shielding gas that flows from the main body 2 towards the outlet mouth 5a of the nozzle 5.

In the embodiment illustrated and described herein, as explained in detail below, the conveyor channels are delimited by the electrical insulation portion 24 on one side and by the inner interface 22 on the other side.

In particular, the inner interface 22 comprises a plurality of grooves 60, six in the embodiment illustrated herein, which are provided on its external surface 22a facing towards the electrical insulation portion 24. The grooves 60 extend starting from one end 22b of the inner interface 22 over a predefined length on the external surface 22a of the same, as is better illustrated in FIG. 8. At the level of the end of said grooves 60 corresponding channels 61 are defined which place the grooves 60 in communication with the inner area delimited by the interface element 22 and the tip holder 8.

Figure 8:
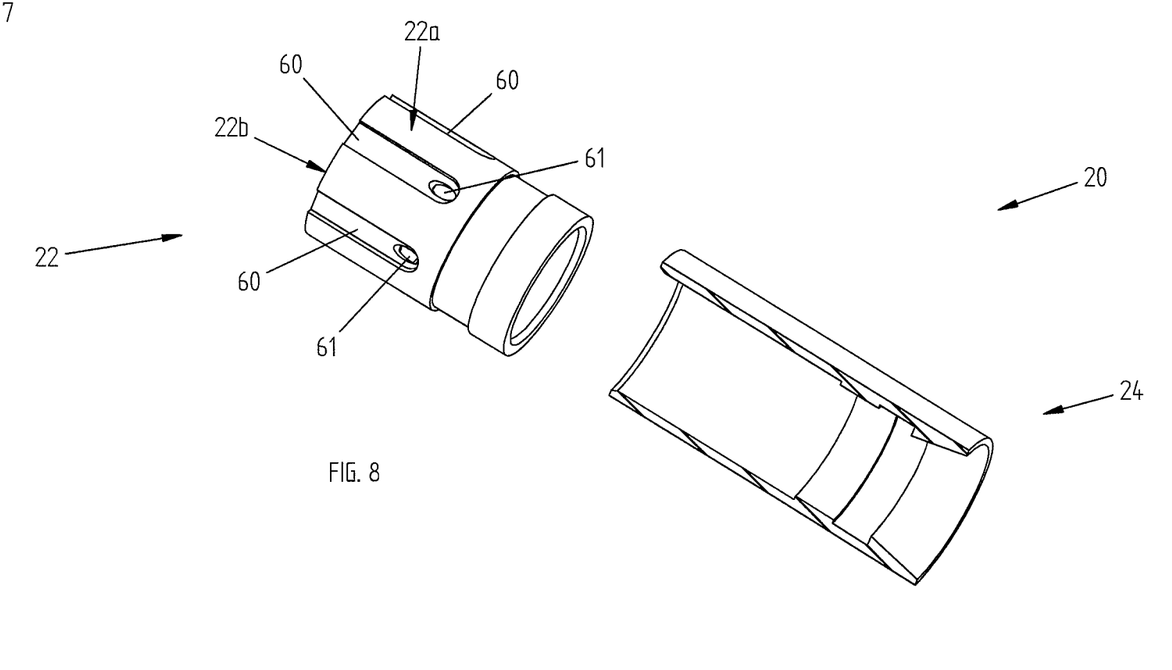
FIG. 8 shows an axonometric view of the details of FIG. 7.

The unit constituted by the inner interface 22 with the grooves 60, the electrical insulation portion 24 and the channels 61 thus defines said plurality of shielding gas conveyor channels.

In the embodiment illustrated herein, and as partially visible in FIG. 8, the six grooves 60 are equally spaced angularly and develop according to a longitudinal and rectilinear direction along the electrical insulation portion 24 itself. The conveyor channels that are defined by the grooves 60 and the electrical insulation portion 24 preferably have a substantially rectangular cross section. Said conveyor channels are preferably created directly during the injection process mentioned above. In variant embodiments, said channels may be obtained in a different manner, for example through a mechanical milling and/or perforating process.

In different variant embodiments, furthermore, said conveyor channels may assume different shapes and configurations than described and illustrated herein. For example, there may be one or more channels with non-rectilinear, inclined, helical development, and so on, and possibly even with various cross sections. A combination of channels in different shapes may also be provided.

Advantageously, as indicated by flow line F2 in FIG. 5A, the shielding gas flow originating from the conveyor channels 35 defined upstream of the insulation means 20, already indicated by F1, is conveyed towards the outlet mouth 5a of the nozzle 5, maintaining it as laminar as possible.

The shielding gas flows into the grooves 60 from the first end 22b of the inner interface 22, follows the grooves 60 and is then conveyed towards the inside along the channels 61 and finally towards the outlet mouth 5a of the nozzle 5.

The shielding gas thus flows out of the outlet mouth 5a of the nozzle 5 with reduced turbulence, which makes it possible to avoid or reduce negative pressures at the outlet of the mouth 5a itself. Advantageously, the quantity of air/impurities attracted into the welding bath, typical of the systems of known type, is considerably reduced. Consequently, also the generation of blowholes with the risk of obtaining fragile welds is reduced.

Furthermore, the corrections of the welding parameters that are typically required in order to overcome said undesired occurrences are reduced or no more necessary for the operator.

The welding torch of the invention, therefore, provided with said conveyor channels that make it possible to maintain the shielding gas flow as laminar as possible, is particularly advantageous for use in automated welding systems, or robots, as described with reference to the preferred embodiment of the invention. In the case of automated welding with a robot, in fact, it is more difficult to intervene timely to cope with the turbulence phenomena that typically occur during welding operations performed with torches of the known type, while said drawback is avoided, or at least partially avoided, by using a torch according to the present invention.

In the embodiment illustrated and described herein, as already explained, the conveyor channels are delimited by the electrical insulation portion 24 on one side and by the inner interface 22 on the other side.

In a first variant embodiment, the conveyor channels can be made in a different way and be delimited by the electrical insulation portion 24 on one side and by the nozzle 5 on the other side.

In another variant embodiment, the conveyor channels can be made in a different manner and be delimited only by the electrical insulation portion 24 and thus be preferably made completely within the electrical insulation portion 24.

In further variant embodiments a combination of the previous possible embodiments may be provided.

While in the embodiment described above the insulation means 20 preferably comprise two co-moulded elements, meaning the electrical insulation portion 24 and the inner interface 22, in variant embodiments said insulation means may be made in a different manner.

In a first variant embodiment, the insulation means may comprise only the electrical insulation portion. In this case, the shielding gas conveyor channels will be delimited by the insulation portion. In a preferred embodiment, the shielding gas conveyor channels will be delimited by the insulation portion on one side and by the tip holder element 8 on the other side, or delimited by the insulation portion on one side and by the nozzle 5 on the other side, or delimited exclusively by the insulation portion if they are created inside it.

Always in said embodiment, the insulation portion will be provided with suitable removable connection means for connection with the tip holder element 8.

In a further variant embodiment, furthermore, the insulation means may comprise, instead, one or more elements (outer interface) interposed between the electrical insulation portion 24 and the nozzle 5.

In this case, the conveyor channels may be partially delimited also by said outer interface element.

It has thus been shown by means of the present description that the torch according to the present invention allows the set objects to be achieved. In particular, compared to the systems used in the torches of the known type, the torch according to the present invention makes it possible to reduce turbulence in the shielding gas that is conveyed to the nozzle and produces the inert atmosphere of the welding bath.

If on the one hand the present invention has been illustrated through the detailed description of one of its embodiments, illustrated in the figures, the present invention is not limited to the particular embodiment described above and illustrated in the figures; on the contrary, further variants of the embodiment described herein fall within the scope of the present invention, which is defined in the claims.

The invention claimed is:

1. Welding torch (1) of the type comprising a main body (2) and an end portion (4) suited to be fed through said main body (2) with a welding wire and a welding area protection gas (103), said welding torch comprising:

a welding unit suited to be powered and provided with an inner channel for the passage of said welding wire;

a conveyor element (5) associated with said welding unit, said conveyor element (5) being provided with an outlet mouth (5*a*) suited to allow said welding wire to move out of said welding unit and suited to allow said protection gas (103) to be conveyed outside of said welding unit;

electrical insulation means (20) interposed between said welding unit and said conveyor element (5), said electrical insulation means (20) comprising at least one insulating portion (24) made of an electrically non-conductive material, at least one conveyor channel (60) suited to convey said protection gas (103) from said main body (2) to said outlet mouth (5*a*) of said conveyor element (5), wherein said at least one conveyor channel (60) is at least partially delimited by said insulating portion (24), wherein said electrical insulation means (20) furthermore comprise an inner interface element (22) associated with the inside of said insulating portion (24), said inner interface element (22) being interposed between said insulating portion (24) and said welding unit and said at least one conveyor channel (60) being delimited at least partially by said insulating portion (24) and at least partially by said inner interface element (22), wherein said insulating portion (24) and said inner interface element (22) are in a tubular shape with longitudinal development, said inner interface element (22) delimiting an inner area suited to accommodate at least part of said welding unit, wherein said inner interface element (22) comprises at least one groove (60) made on its external surface (22*a*) directed towards said insulating portion (24) to define said at least one conveyor channel (60), wherein said inner interface element (22) furthermore comprises at least one channel (61) that places said at least one groove (60) in communication with said inner area delimited by said inner interface element (22), and wherein said at least one groove (60) develops longitudinally along said inner interface element (22) starting from a first end (22*b*) of said inner interface element (22).

2. The welding torch according to claim 1, wherein said at least one conveyor channel is created in said insulating portion and is completely delimited in said insulating portion.

3. The welding torch (1) according to claim 1, wherein said inner interface element (22) comprises a plurality of grooves (60) made on its external surface (22*a*) directed towards said insulating portion (24) in order to define a plurality of conveyor channels.

4. The welding torch (1) according to claim 1, further comprising connection means suited to connect said electrical insulation means (20) to said welding unit.

5. The welding torch (1) according to claim 4, wherein said connection means are at least partially defined in said inner interface element (22).

6. The welding torch (1) according to claim 4, wherein said connection means are at least partially defined on said insulating portion (24).

7. The welding torch (1) according to claim 4, wherein said connection means comprise a thread (21*b*) or a connection through mechanical interference or a snap-on connection.

8. The welding torch (1) according to claim 1, further comprising connection means suited to connect said electrical insulation means (20) to said conveyor element (5).

9. The welding torch (1) according to claim 8, wherein said connection means suited to connect said electrical insulation means (20) to said conveyor element (5) include mechanical interference or a moulding or co-moulding operation in which said electrical insulation means (20) are moulded or co-moulded together with said conveyor element (5).

10. Device (100) for making welds in an atmosphere defined by protection gas (103), comprising the welding torch (1) of claim 1.

* * * * *